(12) United States Patent
Lee et al.

(10) Patent No.: US 6,990,283 B2
(45) Date of Patent: Jan. 24, 2006

(54) POLYMERIC OPTICAL DEVICE HAVING LOW POLARIZATION DEPENDENCE AND METHOD OF FABRICATING THE SAME

(75) Inventors: Jong Moo Lee, Daejon-Shi (KR); Sun Tak Park, Daejon-Shi (KR); Joon Tae Ahn, Daejon-Shi (KR); Jung Jin Ju, Daejon-Shi (KR); Myung Hyun Lee, Daejon-Shi (KR); Kyong Hon Kim, Daejon-Shi (KR)

(73) Assignee: Electronics and Telecommnications Research Institute, Daejon-Shi (KR)

( * ) Notice: Subject to any disclaimer, the term of this patent is extended or adjusted under 35 U.S.C. 154(b) by 30 days.

(21) Appl. No.: 10/777,087

(22) Filed: Feb. 13, 2004

(65) Prior Publication Data

US 2004/0213535 A1    Oct. 28, 2004

(30) Foreign Application Priority Data

Feb. 15, 2003   (KR)  ............. 10-2003-0009598
Nov. 13, 2003   (KR)  ............. 10-2003-0080077

(51) Int. Cl.
*G02B 6/10* (2006.01)
(52) U.S. Cl. .................. 385/131; 385/14; 385/129; 385/130; 385/132
(58) Field of Classification Search .......... 385/14, 385/129, 130, 131, 132, 141
See application file for complete search history.

(56) References Cited

U.S. PATENT DOCUMENTS

| | | |
|---|---|---|
| 5,341,444 A | 8/1994 | Henry et al. |
| 5,930,439 A | 7/1999 | Ojha et al. |
| 6,277,938 B1 | 8/2001 | Koike et al. |
| 2002/0178760 A1 * | 12/2002 | Bona et al. .................. 65/386 |
| 2003/0123828 A1 * | 7/2003 | Garito et al. ............... 385/129 |
| 2003/0174985 A1 * | 9/2003 | Eggleton et al. ............ 385/125 |
| 2003/0190131 A1 * | 10/2003 | Barth ......................... 385/129 |
| 2004/0067022 A1 * | 4/2004 | Chen et al. .................. 385/42 |
| 2004/0190848 A1 * | 9/2004 | Ide ............................. 385/129 |
| 2004/0213535 A1 * | 10/2004 | Lee et al. .................... 385/129 |

OTHER PUBLICATIONS

Hiroshi Takahashi, et al. ; "Polarization-Insensitive Arrayed-Waveguide Wavelength Multiplexer with Birefringence Compensating Film"; IEEE Photonics Technology Letters ; vol. 5, No. 6 ; Jun. 1993 ; pp. 707-709.

Y. Inoue, et al. ; "Polarization Mode Converter with Polyimide Half Waveplate in Silica—Based Planar Lightwave Circuits"; IEEE Photonics Technology Letters ; vol. 6, No. 5 ; May 1994 ; pp. 626-628.

(Continued)

*Primary Examiner*—Brian M. Healy (74) *Attorney, Agent, or Firm*—Mayer, Brown, Rowe & Maw LLP (57) ABSTRACT

Provided is a polymeric optical device comprising a substrate, a lower cladding layer formed on the substrate, at least one core layer pattern formed on a predetermined region of the lower cladding layer and an upper cladding layer having at least two sub-upper cladding layers and formed on the lower cladding layer in which the core layer pattern is formed, and a method of fabricating the same, whereby birefringence of a polymeric optical device could be improved and polarization dependence could be reduced by adjusting the thickness of the sub-upper cladding layer and the number of stacks thereof.

15 Claims, 9 Drawing Sheets

OTHER PUBLICATIONS

S.M. Ojha, et al. ; "*Simple method of fabricating polarisation-insensitive and very low crosstalk AWG grating devices*"; Electronic Letters ; vol. 34, No. 1 ; Jan. 8, 1998 ; pp. 78-79.

N. Keil, et al. ; "*Athermal polarization-independent all-polymer arrayed waveguide grating (AWG) multi/demultiplexer*"; 2000 Optical Society of America ; pp. PD7 - 1 to PD7 3.

* cited by examiner

FIG. 1

16×16 AWG
Nch=131
6×6 μm waveguide
100GHz spacing

POLYMERIC OPTICAL DEVICE HAVING LOW POLARIZATION DEPENDENCE AND METHOD OF FABRICATING THE SAME

BACKGROUND

1. Field of the Invention

The present invention relates to a polymeric optical device and a method of fabricating the same, and more particularly, to a polymeric optical device and a method of fabricating the same capable of reducing variations of wavelength characteristics depending on polarization.

2. Discussion of Related Art

A polymeric optical device has a merit of easily being fabricated, but it has a limitation in an application thereof due to high polarization dependence as compared with the silica optical device, particularly, in the case of an arrayed waveguide grating (hereinafter, referred to as AWG) device. In case of an AWG fabricated by a silica material, a central wavelength difference according to a TE/TM polarization mode is about 0.35 nm (See H. Takahashi, Y. Hibino, and I. Niship, "polarization-insensitive arrayed-waveguide grating wavelength multiplexer on silicon", Optics Lett., vol.17, no.7, pp499–501, 1992). In the case of an AWG device using a polymer, the central wavelength difference according to the TE/TM polarization mode reaches a few nm and it becomes ten times larger than that of the silica AWG device (See Y. H. Min, M. H. Lee, J. J. Ju, S. K. Park, and J. Y. Do, "polymeric 16×16 Arrayed-Wavegudide Grating Router Using Fluorinated Polyethers Operating Around 1550 nm", IEEE J. Select. Topics in Quantum Electron., vol.7, no.5, 806–811, 2001).

Although the central wavelength difference of the silica AWG device is as low as about 0.35 nm, it cannot be ignored. In order to solve this, a method of reducing the TE/TM shift by inserting a half-wave plate into a grating channel portion in the AWG device or coating an amorphous silicon layer (See H. Takahashi, Y. Hibino, Y. Ohmori, and M. Kawachi, "Polarization-insensitive Arrayed-Waveguide Wavelength Multiplexer with Birefringence Compensating Film", IEEE Photon. Technol. Lett., vol.5, no.6, 707–709, 1993), a material having a specific thermal expansion coefficient (See S. M. Ojha, C. Cureton, T. Bricheno, S. Day, D. Moule, A. J. Bell, and J. Tayleor, "Simple method of fabricating polarization-insensitive and very low crosstalk AWG grating device", Electron. Lett., vol.34, no.1, 78–79, 1998), or a material having a specific birefringence characteristic (See S. M. Ojha, et al., "Planar Optical waveguide", U.S. Pat. No. 5,930,430, Jul. 27, 1999), which can offset a stress due to a substrate, on the grating of the AWG device, has been used. By adopting the aforementioned method, the central wavelength shift of the TE/TM in the silica AWG device could be reduced by 0.1 nm or less.

On the other hand, in the case of a polymeric optical device, the TE-TM shift is as large as a few nm due to the stress effect generated by the birefringence of the polymer itself and fabrication thereof. As for a method of reducing the TE-TM shift, most studies have been emphasized on developing a material having low birefringence, by varying characteristics of the polymer itself (See Y. Koike, et al., "Process for the preparation of non-birefringent optical resin and optical elements made by using the resin prepared by the process", U.S. Pat. No. 6,277,938, Aug. 21, 2001). However, since most of the birefringence in the polymeric optical device is caused by the stress effect on the fabrication thereof, there is a burden of developing a new material. Meanwhile, there is a difficulty in fabricating a polarization-insensitive AWG device, in the case of fabricating an optical device with a limited material.

As for a method of reducing the stress of the polymeric optical device, a method for replacing a conventional silicon wafer of a polymeric optical substrate with a polymer has been proposed (See N. Keil, H. H. Yao, C. Zawadzki, J. Bauer, M. Bauer, C. Dreyer, and J. Schneider, "A thermal polarization-independent all-polymer arrayed waveguide grating (AWG) multi/demultiplexer", OFC 2001, Anaheim, post-deadline paper PD7, 2001). But, in this case, since a specific polymer should be used as the substrate, it is difficult to fabricate it and to pack it with a different element.

SUMMARY OF THE INVENTION

The present invention is directed to a polymeric optical device capable of reducing polarization dependence by offsetting the stress effect, without using a specific polymer material.

Further, the present invention provides a method of fabricating a polymeric optical device.

One aspect of the present invention is to provide a polymeric optical device, comprising: a substrate; a lower cladding layer formed on the substrate; at least one core layer pattern formed on a predetermined region of the lower cladding layer; and an upper cladding layer formed on the lower cladding layer in which the core layer pattern is formed, wherein the upper cladding layer is composed of at least two sub-upper cladding layers or more, in order to reduce a birefringence by a thermal stress.

Here, the core layer pattern comprises a core layer formed on the lower cladding layer and a buffer layer formed on the core layer, wherein a component of the core layer pattern is a polymer, and the buffer layer is the same as the upper or the lower cladding layer material. And, the height of the core layer pattern is in the range of 2 to 10 $\mu$m.

In a preferred embodiment of the present invention, each of the substrate, the lower cladding layer, the core layer, and the upper cladding layer is composed of a polymer material, and the polymer material is one material being selected from materials of a fluorinated polyether system, an acrylate system, a silicon resin system, a polyimide system, and a perfluorinated cyclobutane system. The substrate is one selected from a silicon substrate, a silica substrate, a glass substrate, and a polymer substrate.

In addition, birefringence of the polymeric optical device is adjusted by the thickness of the sub-upper cladding layer and the number of stack thereof. And, the surface of the lower cladding layer being contacted with the core layer pattern is placed higher than that of the lower cladding layer being contacted with the upper cladding layer.

Another aspect of the present invention is to provide a method of fabricating a polymeric optical device, comprising the steps of: forming a lower cladding layer on a substrate; forming a core layer pattern on the lower cladding layer; and forming an upper cladding layer on the lower cladding layer in which the core layer pattern is formed, wherein the upper cladding layer is composed of at least two sub-upper cladding layers or more, in order to reduce a birefringence by a thermal stress.

Here, the step of forming the core layer pattern, comprising the steps of: forming a core layer on the lower cladding layer; forming a mask pattern on the core layer; etching the core layer into a shape of the mask pattern; and removing the mask pattern, wherein a portion of the lower cladding is over etched when etching the core layer. And, the lower cladding layer is over etched by approximately 0.1 to 3 $\mu$m.

In a preferred embodiment of the present invention, a step of forming a buffer layer on the core layer between the steps of forming the core layer and the mask pattern on the core layer may be further comprised. In addition, each of the steps of forming the lower cladding layer, the core layer, and the sub-upper cladding layer comprises steps of coating a polymer layer and curing the polymer layer, respectively. Further the step of curing the polymer layer may be performed by means of a thermal curing or an UV curing method.

DETAILED DESCRIPTION OF PREFERRED EMBODIMENTS

Hereinafter, the embodiments of the present invention will be explained with reference to the accompanying drawings. However, the embodiment of the present invention can be changed into a various type, and it should not be understood that the scope of the present invention is limited to the following embodiments. The embodiments of the present invention are provided in order to explain the present invention to those skilled in the art. Those having ordinary skill in the art and access to the teachings of the present invention will recognize additional modifications and applications within the scope thereof. It is therefore intended by the appended claims to cover any and all such applications, modifications, and embodiments within the scope of the present invention.

Figure 1:
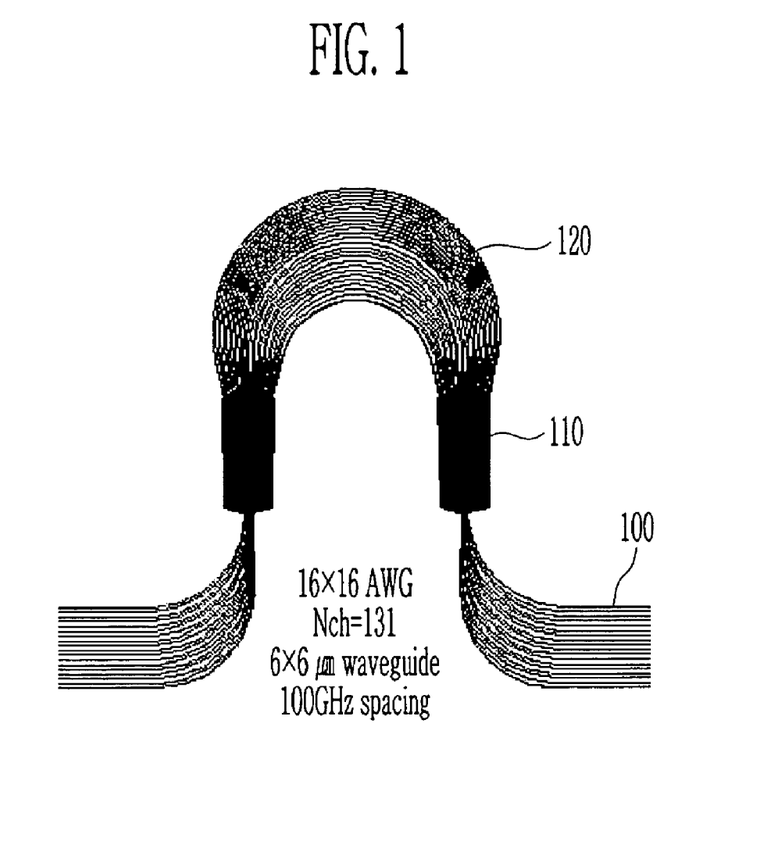
FIG. 1 is a structural diagram of a polymeric optical device (16-channel AWG) for showing a schematic constitution according to a preferred embodiment of the present invention.

As shown in FIG. 1, an AWG according to a preferred embodiment of the present invention comprises an optical waveguide 100, a free propagation region 110, and a grating channel waveguide 120.

Hereinafter, a method of fabricating an AWG of the present invention will be explained with reference to FIGS. 2A to 2E.

Figure 2A:
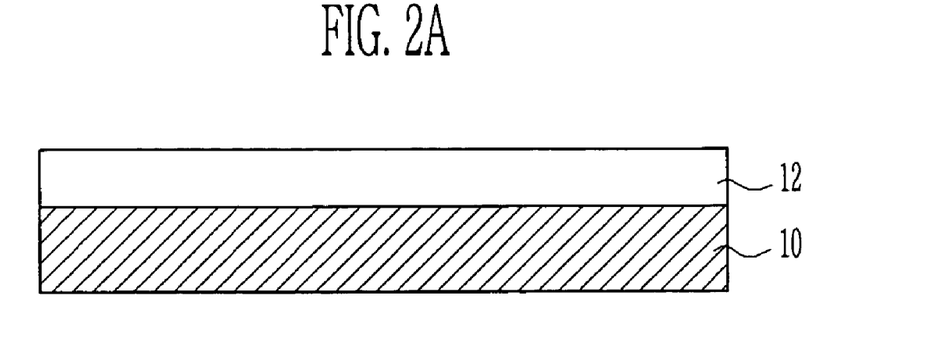
FIGS. 2A to 2D are cross sectional views of processes, respectively, for explaining a method for fabricating the polymeric optical device of FIG. 1.

As described in FIG. 2A, a lower cladding layer 12 is formed on a substrate, for example, a silicon substrate 10, by using a spin coating method. The lower cladding layer 12 may be a polymer having a refractive index of 1.484, for example, model ZP2145 of Zen Photonics Co., Ltd. Thereafter, the lower cladding layer is thermally cured at a temperature of about 250° C.

Figure 2B:
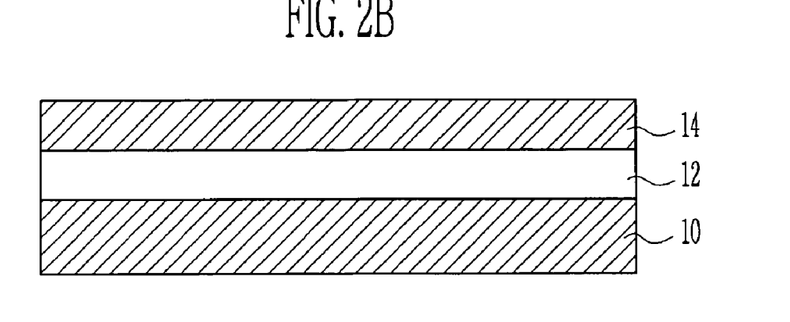

As described in FIG. 2B, a core layer 14 is coated on the cured lower cladding layer 12 with a thickness in the range of 2 to 10 μm, preferably, about 6 μm. As for the core layer 14, model ZP1010 of Zen Photonics Co., Ltd., which has a refractive index of 1.501, may be used. A thermal curing process for the core layer may be performed at a predetermined temperature, i.e. about 250° C.

An etching mask 16 is formed to define a core portion of the waveguide 100 of FIG. 1 on the core layer 14. The etching mask 16, for example, may be a photoresist pattern formed using a common photolithography process, or a metal pattern.

In the case of using the metal pattern as the etching mask, a metal layer (not shown) is deposited on the core layer 14 and a photoresist pattern is formed to define the core portion on the metal layer, by means of a common method. And then, the metal pattern may be formed by etching the metal layer into a shape of the photoresist pattern. Alternatively, the photoresist pattern (not shown) is negatively formed on the core layer 14 to expose a region, where the metal pattern to be formed; the metal layer is filled in the negatively formed portion; and the photoresist pattern is removed by a lift off method, whereby the metal pattern could be formed.

Figure 2C:
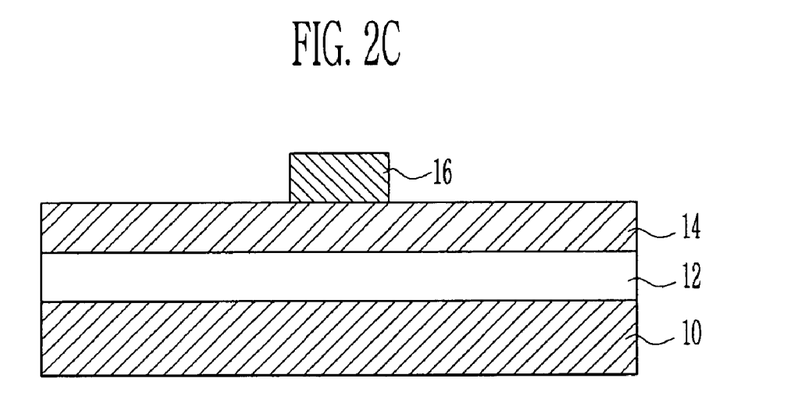

Thereafter, a core layer pattern 14a is formed by etching the core layer 14 into a shape of the etching mask. When etching the core layer, it is preferable to over etch the lower cladding layer 12 by 0.1 to 3 μm. Then, the etching mask is removed by a common method.

Figure 2D:
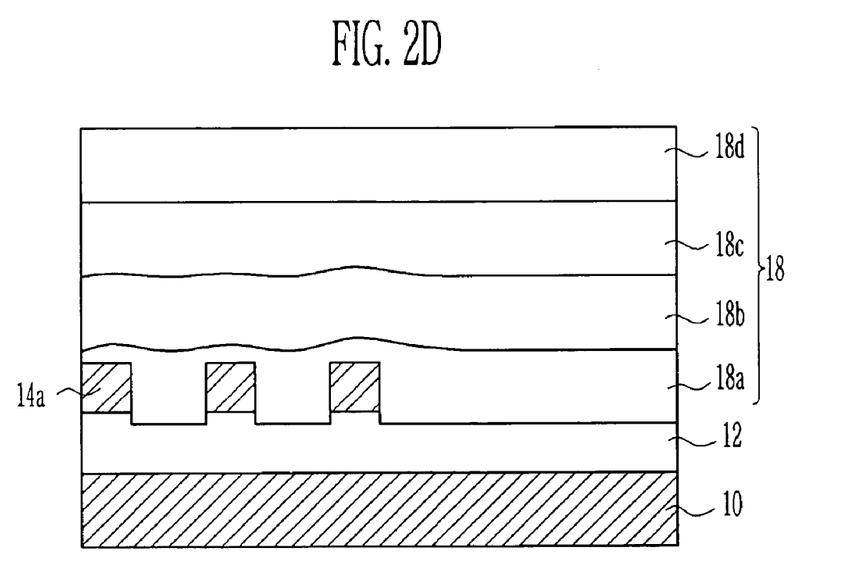

Next, an upper cladding layer 18 is formed above the resultant substrate 10 in which the core layer pattern 14a is formed, with reference to FIG. 2D. Preferably, the upper cladding layer 18 of the present invention may be constituted by several sub cladding layers 18a to 18d so as to improve a birefringence characteristic due to the stress. At this time, the upper cladding layer 18 may be formed to have the same physical properties as those of the lower cladding layer.

In the prior art, an upper cladding layer is formed to have a large thickness enough without a special consideration of the thickness thereof, however, the upper cladding layer 18 of the present embodiment is formed to have a thin thickness and at least one layer or more.

Figure 3:
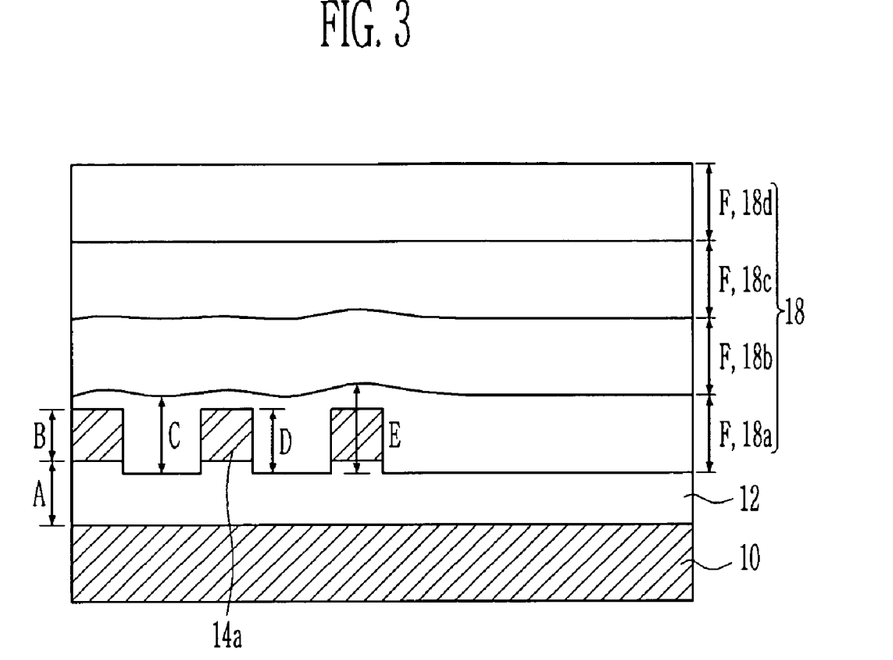
FIG. 3 is a cross sectional view of a polymeric optical device according to a preferred embodiment of the present invention.

For example, as described in FIG. 3, assuming that the height of the core layer 14a (i.e. waveguide pattern) from the lower cladding layer 12 is "D", a first sub-upper cladding layer 18a is formed with a thickness in the error range of about 0.1 to 30% of the etched depth including the core layer 14. That is, the thickness (C) of the first sub-upper cladding layer 18a is similar to the height (D, i.e. the height from the surface of the etched lower cladding layer to the surface of the core layer) of the core layer 14, or thicker than that a little (for example, about 0.1 to 30%), so that the upper cladding layer 18 may be constituted by several sub-upper cladding layers. Therefore, the surface of the lower cladding layer 12 being contacted with the core layer 14a is placed relatively higher than that of the lower cladding layer 12 being contacted with the sub-upper cladding layer 18a.

In the present embodiment, the upper cladding layer 18 may be comprised of, for example, four sub-upper cladding layers 18a to 18d.

Here, the substrate 10, the lower cladding layer 12, the core layer 14, and the upper cladding layer 18, for example, may be one material selected from polymers of a fluorinated polyether system, an acrylate system, a silicone resin system, a polyimide system, and a perfluorinated cyclobutane system. In addition, the lower cladding layer 12, the core layer 14, and the upper cladding layer 18 of the present embodiment are thermally cured at a predetermined temperature after being coated, however, the curing process may also be performed by applying an UV, except for the thermal curing.

On the other hand, as a modified process of the above-mentioned process, a buffer layer (not shown) having the same material as that of the upper cladding layer could be further formed on the core layer 14 with a thickness of about 3 $\mu$m or less, before etching the core layer 14. Then, the etching mask is formed in a predetermined region on the buffer layer (not shown), the buffer layer and the core layer 14 are etched using the etching mask, and the sub-upper cladding layers 18a to 18d are formed on all the structure. In this case, the lower cladding layer may be over-etched after etching the core layer 14 and the over-etched depth can be adjusted within a thickness of the buffer layer.

Figure 4:
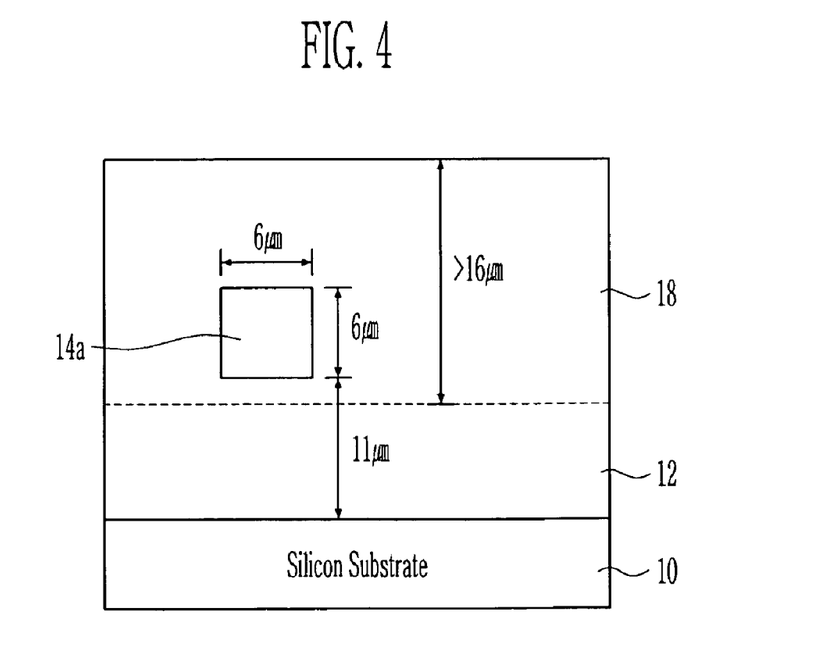
FIG. 4 shows a thickness of each layer in a polymeric optical device according to a preferred embodiment of the present invention.

FIG. 4 shows a thickness of each layer in a polymeric optical device (AWG) being fabricated according to a preferred embodiment of the present invention. Referring to FIG. 4, the lower cladding layer 12 having a thickness of 11 $\mu$m is formed on the silicon substrate 10, the core layer pattern 14a of about 6×6 $\mu$m is formed on the lower cladding layer 12, and the upper cladding layer 18 having a thickness of about 16 $\mu$m or more is formed on the lower cladding layer 12 in which the core layer pattern 14 is formed. At this time, the core layer pattern 14a of 6×6 $\mu$m is formed by forming the core layer 14 having a thickness of 6 $\mu$m on the lower cladding layer 16 and then etching it by a thickness of about 7 $\mu$m into a shape of the etching mask, which is formed by means of the photolithography method, as described above. Here, the thickness of the core layer 14 is 6 $\mu$m, but the etched depth of the core layer 14 is 7 $\mu$m. It means that the lower cladding layer 12 is over-etched by about 1 $\mu$m.

Accordingly, the thickness of the upper cladding layer 18 mentioned in the present invention means the thickness from the surface of the over-etched lower cladding layer 12.

Meanwhile, each of the sub-upper cladding layers 18a to 18d, as described in FIG. 3, may be different each other. In other words, the first sub-upper cladding layer 18a may be not uniform due to a morphology caused by the core layer pattern 14a. In addition, as the thickness of the first sub-upper cladding layer 18a is thinner, the thickness uniformity of the first sub-upper cladding layer 18a would be deteriorated more.

Here, FIGS. 5A to 5D are graphs showing a variation of transmissivity, by wavelengths, depending on a thickness of a sub-upper cladding layer, and the thickness of the first sub-upper cladding layer 18a becomes "C" of FIG. 3, in the results of FIGS. 5A to 5D.

Figure 5A:
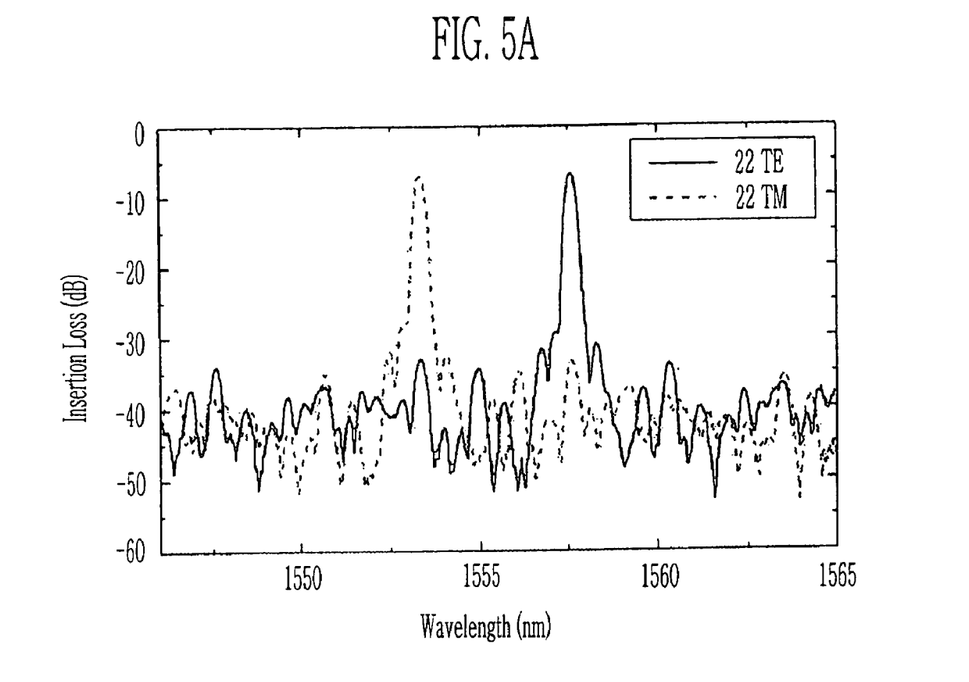
FIGS. 5A to 5D are graphs showing a variation of wavelength-dependent insertion losses, depending on the thickness of a sub-upper cladding layer in a polymeric optical device according to a preferred embodiment of the present invention.

FIG. 5A shows the case that the upper cladding layer is formed to be a single layer of 22 $\mu$m in a thickness; FIG. 5C shows the case that the upper cladding layer is formed to have 3 layers each having 7 $\mu$m, and FIG. 5D is a graph of a wavelength region being enlarged near the peak.

At first, in the case of forming the upper cladding with a single layer of 22 $\mu$m thickness, the TM mode on a channel shows the highest transmissivity (dB) at the wavelength of 1553.34 nm while the TE mode on the same channel shows the highest transmissivity (dB) at the wavelength of 1557.58 nm. Thus the TE-TM shift is measured to 4.24 nm as described in FIG. 5A. This TE-TM shift is in accord with the aforementioned birefringence of 4 nm. On the other hand, as shown in FIGS. 5B and 5C, it is found that the TE-TM shift is decreased if the upper cladding layer 18 is formed with at least 2 layers or more.

Here, as shown in FIG. 4, in the case of forming the upper cladding layer with a single layer of 16 $\mu$m in a thickness, the TE-TM shift is 4.16 nm and slightly reduced compared with the case that the upper cladding layer is formed with a thickness of 22 $\mu$m.

Figure 5B:
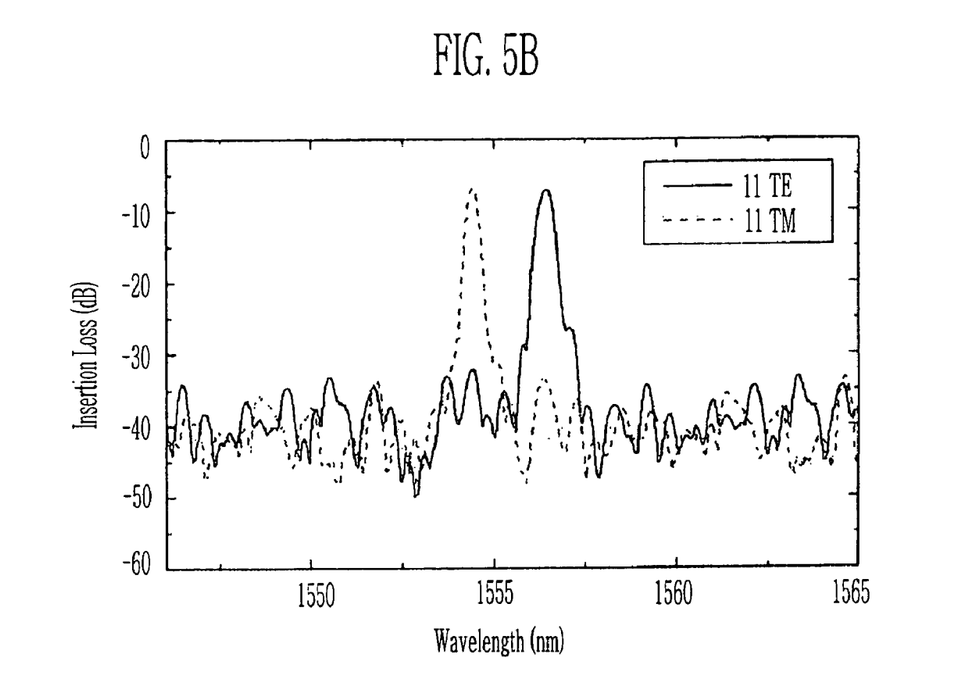
Figure 5C:
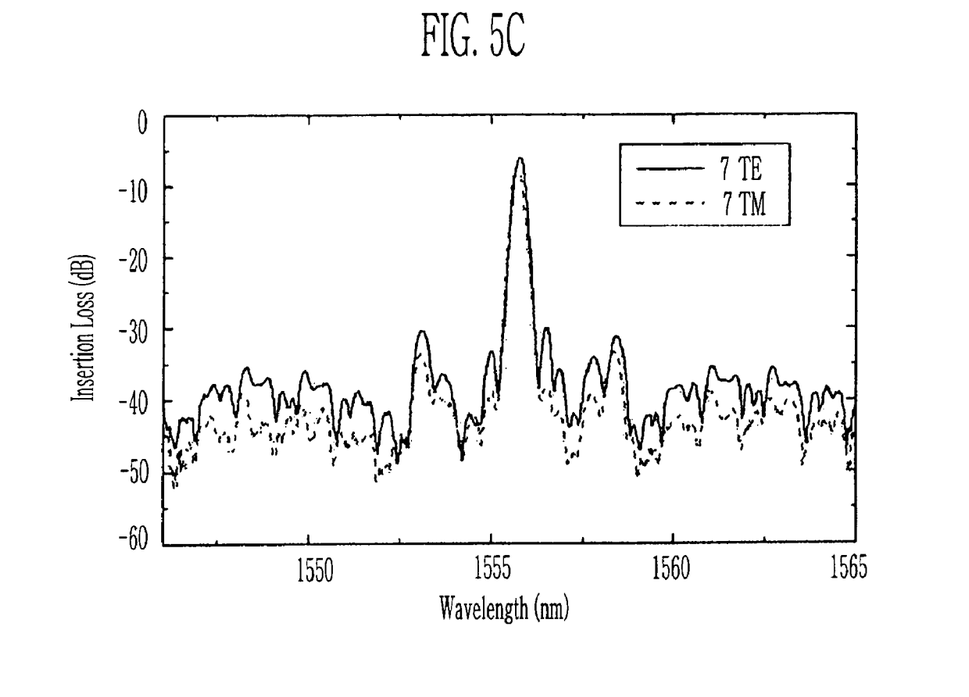
Figure 5D:
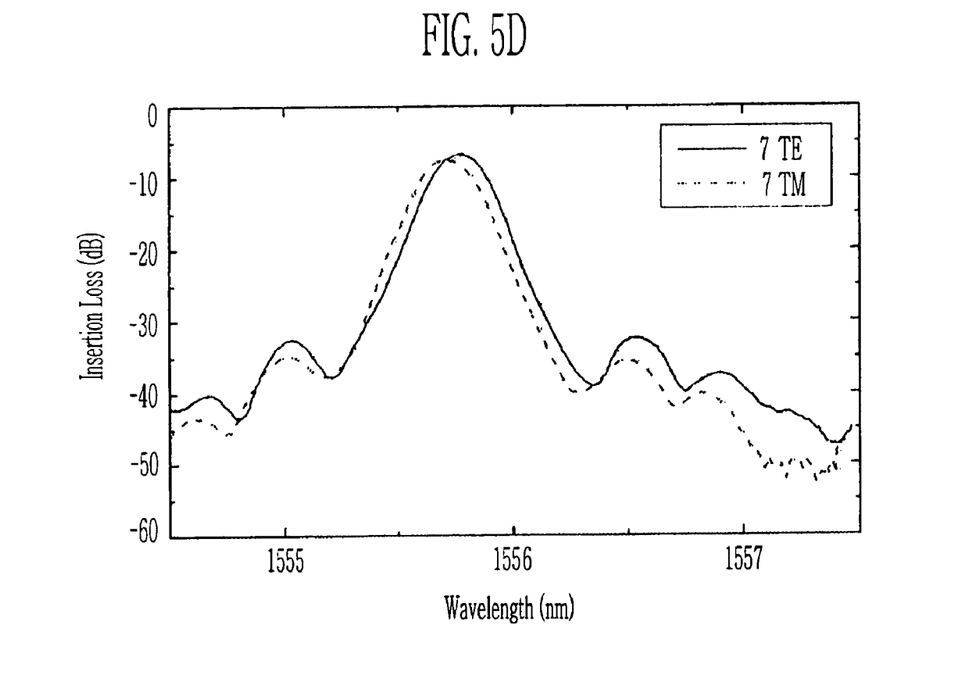

On the other hand, in the case of forming the upper cladding layer to a 2-layered structure each having a thickness of 11 $\mu$m, the TE-TM shift is largely reduced to 1.98 nm as shown in FIG. 5B and, in the case of forming the upper cladding layer to a 3-layered structure each having a thickness of 7 $\mu$m, the TE-TM shift is remarkably reduced to 0.08 nm as shown in FIG. 5C.

Figure 6:
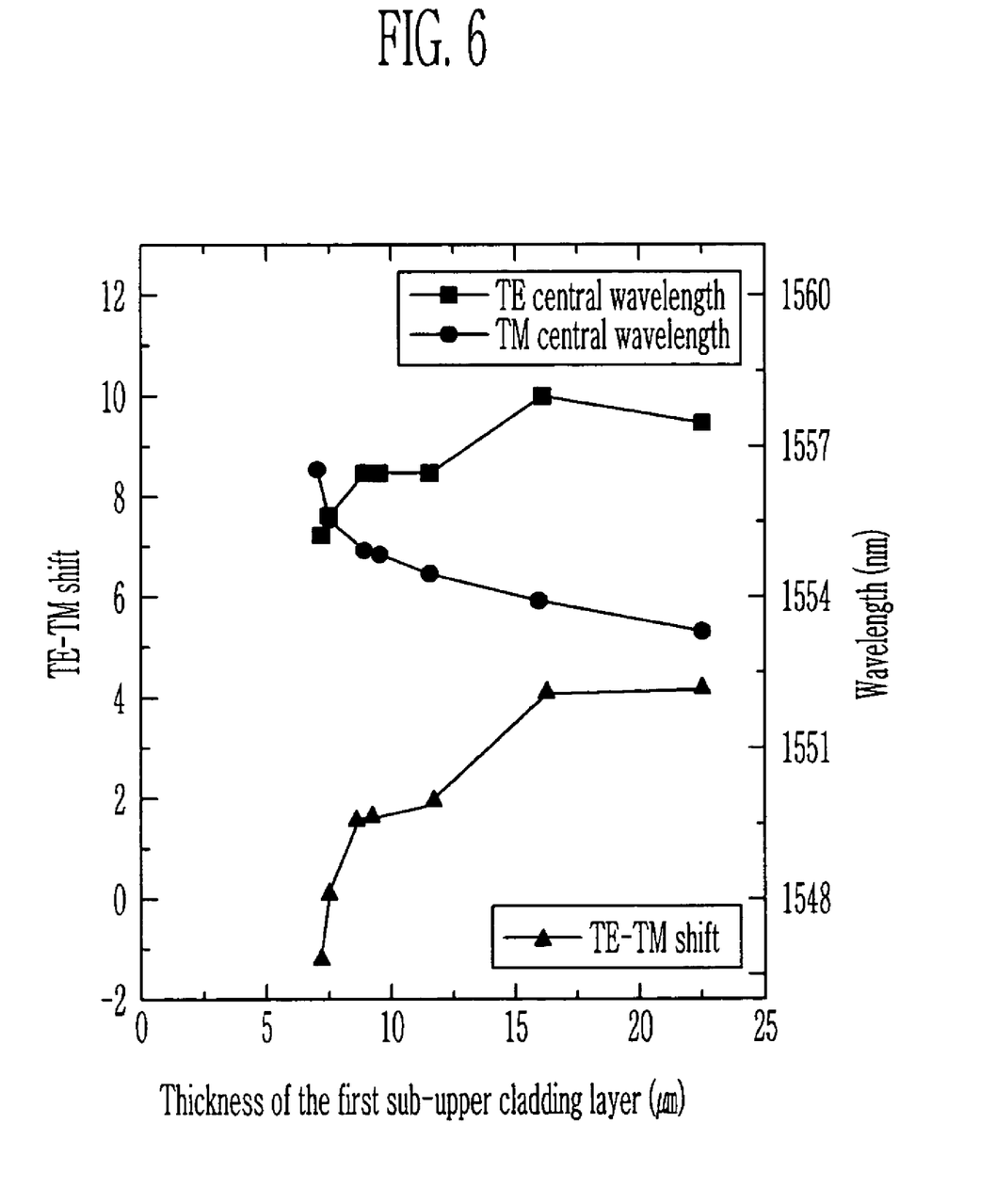
FIG. 6 is a graph showing a degree of a TE-TM shift, when a thickness of a first sub-upper cladding layer is changed from 7 to 22 μm, in the case of forming a multi-layered upper cladding.

FIG. 6 is a graph for showing a variation of TE-TM shift (the difference between the peak wavelength for the TE and the TM mode), when a thickness of a first sub-upper cladding layer is changed from 7 to 22 $\mu$m, in forming an upper cladding layer of multi layers. Observing the TE-TM shift in this graph, it could be found that the TE-TM shift is rapidly increased as the thickness of the first sub-upper cladding layer becomes about 12 $\mu$m or more.

The TE-TM shift becomes about 1.5 nm, in case where the thickness of the first sub-upper cladding layer is about 9 $\mu$m.

In addition, it can be found by the experiment of FIG. 6 that the TE-TM shift is reversed to a negative direction, in case where the first sub-upper cladding layer is formed with 7 $\mu$m or less. Such result represents that the TE-TM shift can be removed by adjusting the thickness of the sub-upper cladding layer.

The thicknesses of the second and the third sub-upper cladding layers act as an important parameter, since the thicknesses of the second and the third sub-upper cladding layers affect the TE-TM shift. That is, the second and the third sub-upper cladding layers can be formed with the same thickness as that of the first sub-upper cladding layer, by properly adjusting the thicknesses thereof. But, the TE-TM shift according to a thickness of the upper cladding layer may be varied to some degree depending on a kind of a polymer material being used.

As described above, it is expected that the TE-TM shift of the polymeric AWG be caused by a thermal stress resulting from a difference of thermal expansion coefficients between the substrate and the polymer material. In addition, if the upper cladding layer is formed with multi layers as mentioned in the present embodiment, the thermal stress is decrease, whereby the TE-TM shift would be decreased.

On the other hand, in order to observe the relation of the TE-TM shift due to the upper cladding layer in detail, the present inventors examined the TE-TM shift by adjusting the number of the sub-upper cladding layer. At this time, while setting up each of the upper cladding layers to be equal, the present inventors observed the TE-TM shift by adjusting the thicknesses of the sub-upper cladding layers to 4.5, 6.5, 11, and 20 $\mu$m, respectively, in order to observe a variation according to the thickness of the sub-upper cladding layer as well. The result of the experiment has been shown in FIG. 7.

Figure 7:
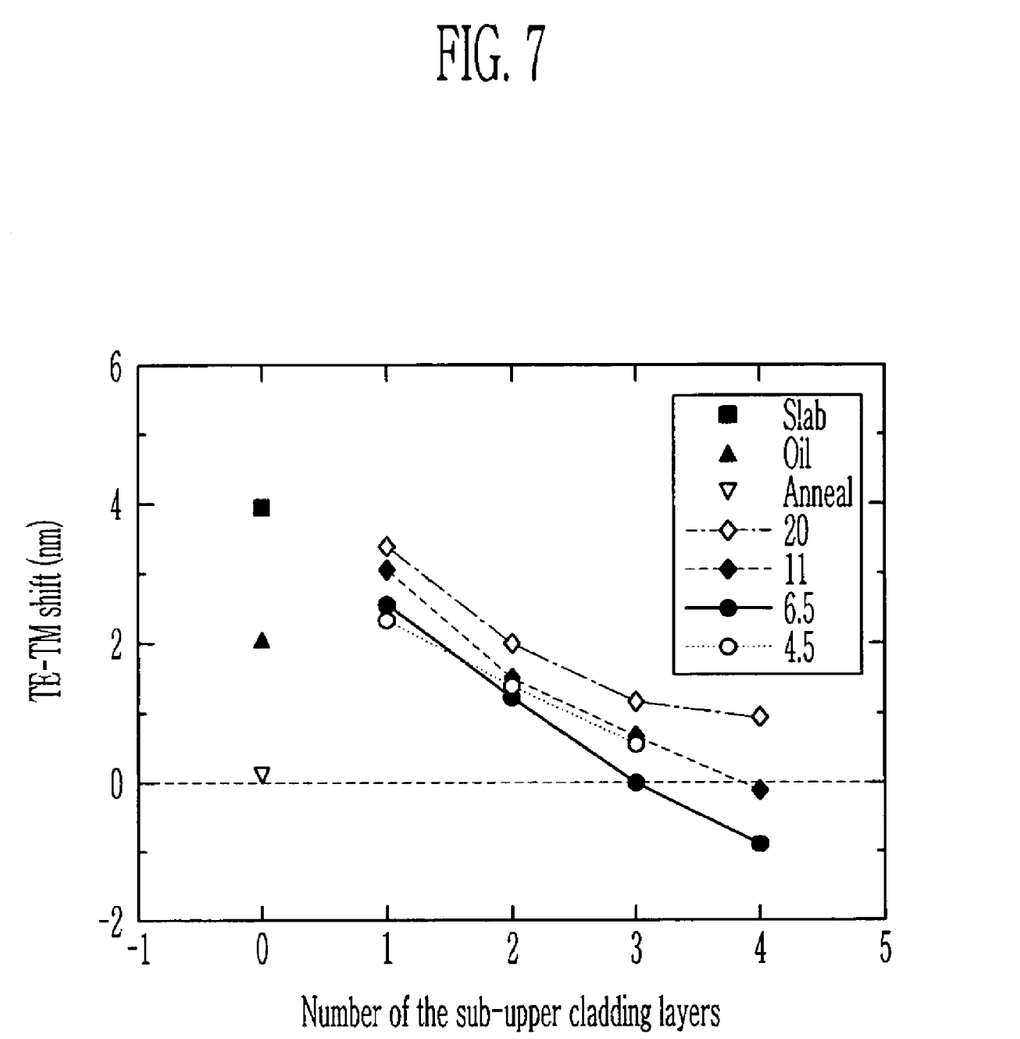
FIG. 7 is a graph for showing a TE-TM shift depending on the number of stacks of a sub-upper cladding layer in a polymeric optical device according to a preferred embodiment of the present invention.

In FIG. 7, "slab" shows the TE-TM shift of 3.9 nm corresponding to a birefringence of 0.0039, which was measured by a prism coupling method after forming the core layer on the lower cladding layer during fabrication of the AWG (referring to FIG. 2C). In addition, "oil" shows the measured result of the TE-TM shift in the state that the stress due to the upper cladding layer has been excluded by using an index-matching oil having the same refractive index as that of the upper cladding layer, instead of forming the upper cladding layer over the core layer pattern 14a. The "oil" state has the TE-TM shift of about 1.9 nm. Further, "Anneal" of FIG. 7 is the TE-TM shift when a heat treatment is performed at a temperature of 250° C. for about 2 hours for the same case as marked as "oil," and it has the TE-TM shift of about 0.19 nm. As a result, it has been found that the stress is removed during the curing process of the upper cladding layer, so that the TE-TM shift may be eliminated. It shows that the thermal stress is generated in the upper cladding layer after the first sub-upper cladding layer is coated, cured, and then cooled to room temperature. Thus, the TE-TM shift is derived due to the stress, as shown in FIG. 7. At the time of forming the first sub-upper cladding layer, the TE-TM shift becomes a maximum value. Thereafter, the TE-TM shift decreases gradually as the second, the third, and the fourth upper cladding layer are formed. In addition, the thicker the thickness of the first sub-upper cladding layer is, the larger the value of the TE-TM shift is. By contrast, if the thickness of the first sub-upper cladding layer becomes thinner, the TE-TM shift decreases linearly. Further, it has been noted that if the number of stacks for each of the sub-layer thickness increases, the TE-TM shift decreases nearly close to "0". By the way, an influence of the upper portion decreases gradually as the thickness of the sub-upper cladding layer becomes thicker, so that it is difficult for the TE-TM shift to have a value of "0" in that case.

As a result, it can be known that birefringence due to the thermal stress is generated when the first sub-upper cladding layer is formed, in fabricating the polymeric optical device, and the degree of birefringence can be controlled by forming the first sub-upper cladding layer with a proper thickness considering the data of the graph and forming the sub-upper cladding layers thereon.

Figure 8:
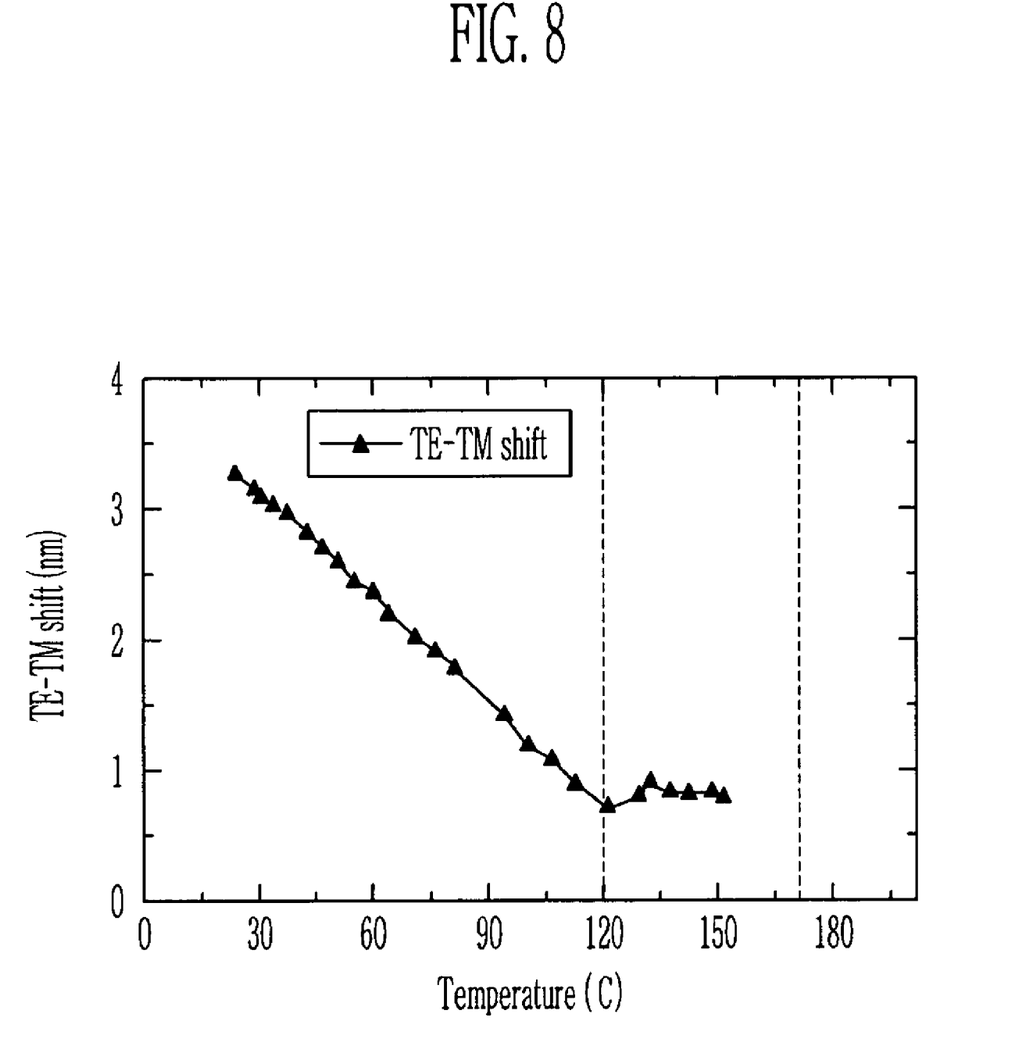
FIG. 8 is a graph for showing a TE-TM shift depending on a temperature, in case where a thickness of a sub-upper cladding layer is 20 μm, in a polymeric optical device according to a preferred embodiment of the present invention.

FIG. 8 is a graph for the measured variation of the TE-TM shift depending on the temperature of the AWG formed with a single layer of 20 μm in a thickness. Referring to FIG. 8, it can be noted that the TE-TM shift decreases linearly from about 3.3 nm to 0.7 nm as the temperature increases from 10° C. to 120° C. which is near the glass transition temperature of the cladding material, while the TE-TM shift is almost constant over the glass transition temperature. These results show that most of the thermal stress is induced during the cooling process below the glass transition temperature of the cladding material.

Figure 9:
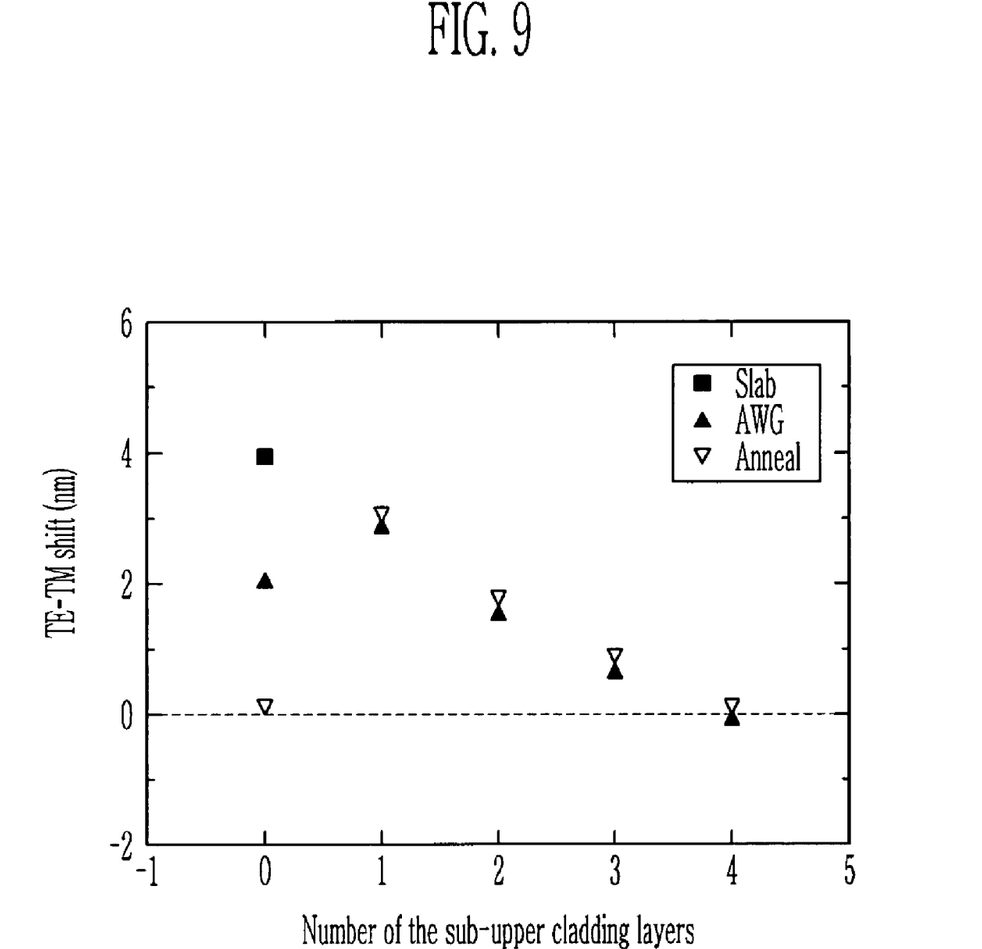
FIG. 9 is a graph showing a TE-TM shift depending on the number of stacks of a sub-upper cladding layer in case where a thickness thereof is 11 μm.

FIG. 9 is a graph for showing a TE-TM shift depending on the number of stacks in an upper cladding in case where a thickness thereof is 11 μm. The results in FIG. 9 show the TE-TM shift after a heat treatment at 250° C. for 2 hours for the thickness of the sub-upper cladding layer set to 11 μm. Referring to FIG. 9, all of the TE-TM shifts increase a little except for a sample without an upper cladding layer (i.e. slab). The experiment in FIG. 9 explains that a repeated thermal curing does not affect the decrease of the TE-TM shift as in FIG. 7.

According to the present invention, an upper cladding layer of a polymeric optical device such as an AWG is formed with a multi-layered sub-upper cladding layer. At this time, it is possible to decrease birefringence, that is, a TE-TM shift, by adjusting the thickness and the number of stack of the sub-upper cladding layer, so that a polymeric optical device with low polarization dependence could be fabricated.

In addition, the multi-layered upper cladding layer can be fabricated with only a simple process without varying a structure thereof.

Although the present invention has been illustrated and described with respect to exemplary embodiments thereof, the present invention should not be understood as limited to the specific embodiment, and it should be understood by those skilled in the art that the foregoing and various other changes, omission and additions may be made therein and thereto, without departing from the spirit and scope of the present invention.

What is claimed is:

1. An optical device, comprising:
   a substrate;
   a lower cladding layer formed on the substrate;
   at least one core layer pattern formed on a predetermined region of the lower cladding layer; and
   an upper cladding layer formed on the lower cladding layer in which the core layer pattern is formed,
   wherein the upper cladding layer is composed of at least two sub-upper cladding layers or more, in order to reduce a birefringence by a thermal stress.

2. The optical device claimed in claim 1, wherein the core layer pattern comprises a core layer formed on the lower cladding layer and a buffer layer formed on the core layer, wherein a component of the core layer pattern is a polymer, and the buffer layer is the same as the upper or the lower cladding layer material.

3. The optical device claimed in claim 1, wherein the height of the core layer pattern is in the range of 2 to 10 μm.

4. The optical device claimed in claim 1, wherein each of the substrate, the lower cladding layer, the core layer, and the upper cladding layer is composed of a polymer material, and the polymer material is one material being selected from materials of a fluorinated polyether system, an acrylate system, a silicon resin system, a polyimide system, and a perfluorinated cyclobutane system.

5. The optical device claimed in claim 1, wherein the substrate is one selected from a silicon substrate, a silica substrate, a glass substrate, and a polymer substrate.

6. The optical device claimed in claim 1, wherein birefringence of the polymeric optical device is adjusted by the thickness of the sub-upper cladding layer and the number of stack thereof.

7. The optical device claimed in claim 1, wherein the surface of the lower cladding layer being contacted with the core layer pattern is placed higher than that of the lower cladding layer being contacted with the upper cladding layer.

8. A method of fabricating an optical device, comprising the steps of:
   forming a lower cladding layer on a substrate;
   forming a core layer pattern on the lower cladding layer; and
   forming an upper cladding layer on the lower cladding layer in which the core layer pattern is formed, wherein the upper cladding layer is composed of at least two sub-upper cladding layers or more, in order to reduce a birefringence by a thermal stress.

9. The method of fabricating the optical device claimed in claim 8, wherein the step of forming the core layer pattern, comprising the steps of:
forming a core layer on the lower cladding layer;
forming a mask pattern on the core layer;
etching the core layer into a shape of the mask pattern; and
removing the mask pattern,
wherein a portion of the lower cladding is over etched when etching the core layer.

10. The method of fabricating the optical device claimed in claim 9, wherein the lower cladding layer is over etched by approximately 0.1 to 3 $\mu$m.

11. The method of fabricating the optical device claimed in claim 9, further comprising a step of forming a buffer layer on the core layer between the steps of forming the core layer and the mask pattern on the core layer.

12. The method of fabricating the optical device claimed in claim 8, wherein each of the steps of forming the lower cladding layer, the core layer, and the sub-upper cladding layer comprises steps of coating a polymer layer and curing the polymer layer, respectively.

13. The method of fabricating the optical device claimed in claim 12, wherein the step of curing the polymer layer may be performed by means of a thermal curing or an UV curing method.

14. An optical device, comprising:
a substrate;
a lower cladding layer formed on the substrate;
at least one core layer pattern formed on a predetermined region of the lower cladding layer, said at least one core layer pattern having a height in the range of 2 to 10 $\mu$m; and
an upper cladding layer composed of at least two sub-upper cladding layers and formed on the lower cladding layer in which the core layer pattern is formed.

15. A method of fabricating an optical device, comprising:
forming a lower cladding layer on a substrate;
forming a core layer pattern on the lower cladding layer; and
forming an upper cladding layer composed of at least two sub-upper cladding layers and formed on the lower cladding layer in which the core layer pattern is formed,
wherein the step of forming the core layer pattern, comprising:
forming a core layer on the lower cladding layer;
forming a mask pattern on the core layer;
etching the core layer into a shape of the mask pattern; and
removing the mask pattern,
wherein a portion of the lower cladding is over etched when etching the core layer by approximately 0.1 to 3 $\mu$m.

* * * * *